INVENTOR.
JEAN H. CLARK
BY
Edward R. Hedden

March 6, 1962 J. H. CLARK 3,024,421

LINEAR DISCRIMINATOR CIRCUIT

Filed Sept. 20, 1957 3 Sheets-Sheet 2

INVENTOR.
JEAN H. CLARK
BY
Edward P. Redden

INVENTOR.
JEAN H. CLARK
BY
Edward P. Redden

United States Patent Office 3,024,421

Patented Mar. 6, 1962

3,024,421

LINEAR DISCRIMINATOR CIRCUIT

Jean H. Clark, 19216 San Bernadino Road, Covina, Calif.

Filed Sept. 20, 1957, Ser. No. 685,103
10 Claims. (Cl. 329—143)

This invention relates to wave transmission networks and particularly to a discriminator network having improved linearity.

In the transmission of information by means of frequency or phase modulation systems, it is necessary to use a device called a discriminator to assist in converting the modulated signal back to the original form. Devices similar to such discriminators have also been used for other purposes, such as in testing equipment or in a feedback circuit to secure more linear modulation in the transmitting equipment. In these devices distortion results when there is a non-linear variation in the output voltage or current with frequency variations of the input signal. There should at all times, within the band pass of the input signal, be a linear relation of the output voltage or current to the input frequency.

It is therefore an object of this invention to provide an improved discriminator circuit.

It is another object of this invention to provide a discriminator circuit of high linearity when translating input signals within a given band width into amplitude modulated output voltage or current signals.

It is a further object of this invention to provide an improved discriminator circuit utilizing a plurality of networks having preselected poles and zeros at frequencies dependent on the center and edge frequecies of the band pass of the dricriminator.

It is another object of this invention to produce an output voltage in an improved discriminator circuit whose linearity in magnitude as a function of frequency variations in discriminator input signal within a given band width is greatly improved.

It is a further object of this invention to provide an improved discriminator circuit utilizing a plurality of networks having preselected poles and zeros at frequencies spaced along the frequency spectrum in a manner to produce substantially linear variations in output voltage or current with respect to input frequencies of said discriminator circuit within the discriminator design band width.

Other objects of this invention will become apparent from the following description taken in conjunction with the accompanying drawings in which.

The principle on which the preferred embodiment of the linear discriminator circuit of this invention operates is that of applying an input voltage or current, which has previously been made uniform in amplitude to remove amplitude modulation, through two equal resistors, $R_1$ and $R_2$ in FIG. 6, to two networks constructed as hereinafter described, so that in portions of these two networks, two voltages are produced which, when properly rectified and combined, will produce an output voltage which is substantially proportional to the frequency of the input voltage or current. The two networks, although they may schematically appear to be the same, have different circuit constants. One network may be considered the lower frequency network and will be referred to hereafter as the A network. The other network may be considered the higher frequency network and will be referred to hereafter as the B network.

In designing a discriminator circuit of the type contemplated by this invention, it is necessary to know, or to select, a center frequency, a design band width, and a design impedance. The selection of the design impedance is generally influenced by the center frequency and the band width since it is difficult to construct physical components with a low enough capacity to premit a high design impedance at high frequencies. For example, at 130 megacycles per second, the design impedance should usually be from 250 to 400 ohms, while at lower frequency, impedances of several thousand ohms may be employed.

The design impedance of the networks utilized by the discriminator circuit of this invention will be designated R. The center frequency for which the discriminator circuit is designed will be designated $f_b$, while the upper and lower edge frequencies of the design band pass will be designated $f_c$ and $f_a$, respectively. The preferred embodiment of this invention utilizes two additional frequencies which will be designated $f_x$ and $f_d$, a low and high frequency, respectively.

Networks have been designed in the past with poles and zeros at preselected frequencies by methods which are well-known to those skilled in the art. Usually the designer utilizes Foster's Reactance Theorem, Cauer's extension thereof, or other well-known means. A network has a pole when the reactive impedance of the network at the "pole" frequency is substantially infinite. A network has a zero, when the reactive impedance of the network at the "zero" frequency is substantially zero.

Figure 1:
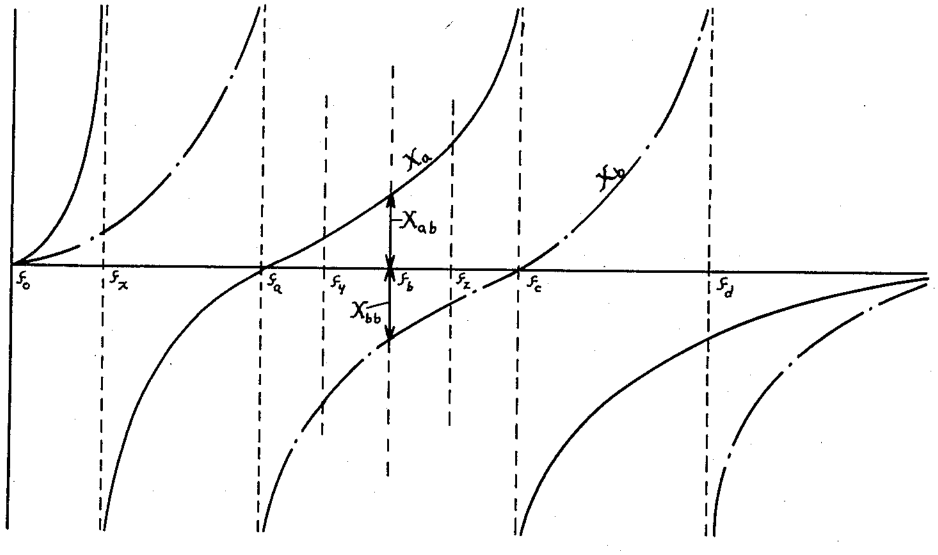
FIG. 1 is a graph of the variations in reactive impedance across the frequency spectrum of two networks designed in the manner contemplated in a preferred embodiment of this invention.

Referring now to FIG. 1, the reactance of the A network plotted against frequency is shown by the solid lines. The A network is designed to have poles at frequencies $f_x$ and $f_c$, zeros at frequencies $f_0$ and $f_a$, and a positive reactive impedance, $X_{ab}$, at center frequency $f_b$ equal to the design impedance, R, of the network. The variations in reactance of the B network with frequency are shown by the broken line in FIG. 1. The B network is designed to have poles at frequencies $f_a$ and $f_d$, zeros at frequencies $f_0$ and $f_c$, and a negative reactive impedance, $X_{bb}$, equal to the design impedance, R, of the network at center frequency $f_b$.

Figure 2:
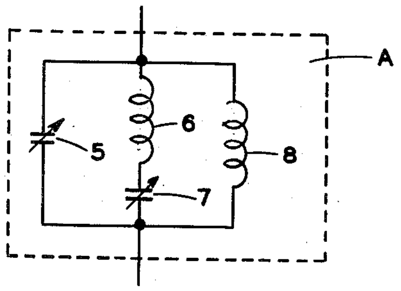
FIG. 2 is a schematic drawing of a network used in a preferred embodiment of this invention.
Figure 3:
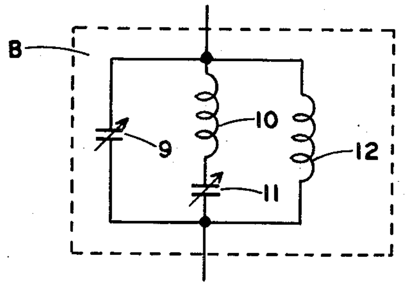
FIG. 3 is a schematic drawing of a second network used in a preferred embodiment of this invention.
Figure 4:
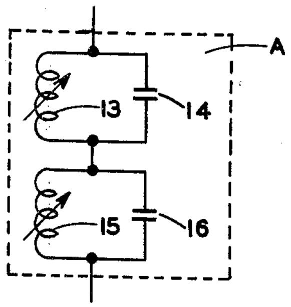
FIG. 4 is a schematic drawing of a network utilized in an alternate embodiment of the discriminator circuit contemplated by this invention.
Figure 5:
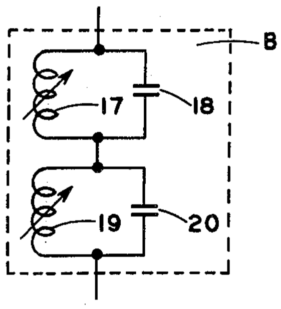
FIG. 5 is a schematic drawing of a second network utilized in an alternate embodiment of the discriminator circuit contemplated by this invention.

FIGS. 2 and 3 schematically show typical arrangements of components utilized in the A network and B network, respectively. It is clear, however, that there are many variations in arrangement of the components which would still produce reactance vs. frequency curves similar to those shown in FIG. 1. The essential characteristic of these networks is that they have their own poles and zeros at specified frequencies and have the specified reactances at the center frequency. Alternate arrangement of the elements to accomplish the same results are shown in FIGS. 4 and 5 for the A network and the B network, respectively.

Figure 6:
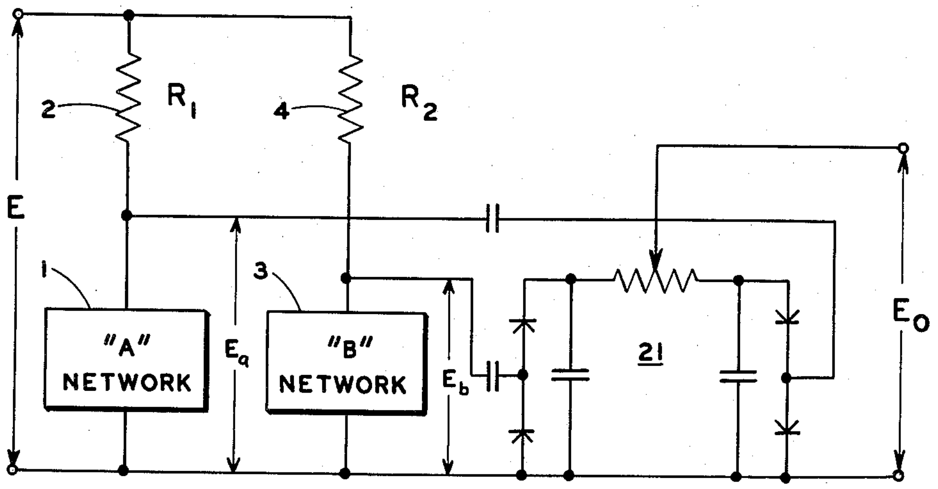
FIG. 6 is a schematic drawing of a preferred embodiment of the discriminator circuit contemplated by this invention.

Referring to FIG. 6, a schematic drawing of a preferred embodiment of the discriminator circuit contemplated by this invention is shown. In this embodiment, A network 1 is connected in series with feed resistor 2 across input voltage signal E from a source thereof (not shown). B network 3 is connected in series with feed resistor 4 across signal E. Resistors 2 and 4 are preferably designed to have resistances $R_1$ and $R_2$ equal to the design resistance R, but this is not essential and may be varied to some extent in order to secure greater linearity or to compensate for loading effect of the output circuit.

As a result of the input signal voltage E being impressed across resistor 2 and A network 1 connected in series, a variable voltage $E_a$ is generated across network 1. The magnitude of this voltage is a predetermined function of the frequency of input voltage E. Similarly, as a result of the input signal voltage E being impressed across resistor 4 and B network 3 connected in series, a variable voltage $E_b$ is generated across network 3. The magnitude of this voltage is also a predetermined function of the frequency of the input voltage E. Voltages $E_a$ and $E_b$ are coupled into, rectified and combined in diode arrangement 21 in a manner to produce output voltage $E_o$ which is amplitude modulated as a linear function of $E_a$—$E_b$.

At this point it will be helpful to present some of the theory of networks which are constructed similar to the A and B networks of the discriminator of this invention. According to work done by Ronald M. Foster, published in the Bell System Technical Journal in April, 1924 and discussed in Terman's "Radio Engineers' Handbook," E. Guillemin's "Communication Networks" and elsewhere, the driving point impedance Z of a two terminal network, such as the A and B networks used in the discriminator of this invention, is $$Z=\pm j\frac{H(\omega^2-\omega_1^2)(\omega^2-\omega_3^2)\ .\ .\ .\ (\omega^2-\omega_p^2)}{\omega(\omega^2-\omega_2^2)(\omega^2-\omega_4^2)\ .\ .\ .\ (\omega^2-\omega_q^2)} \qquad (1)$$

if there is a pole at the origin, and $$Z=\pm j\omega H\frac{(\omega^2-\omega_1^2)(\omega^2-\omega_3^2)\ .\ .\ .\ (\omega^2-\omega_p^2)}{(\omega^2-\omega_2^2)(\omega^2-\omega_4^2)\ .\ .\ .\ (\omega^2-\omega_q^2)} \qquad (2)$$

if there is a zero at the origin. In these equations $\omega$ is $2\pi f$ where $f$ is the frequency, and the subscripts 1, 3, . . ., $p$ refer to the locations of the zeros while the subscripts 2, 4, . . ., $q$ refer to the locations of the poles on the frequency axis of FIG. 1 for example. The quantity H is a real constant which takes into account the fact that one additional piece of information is required to complete the specification of the reactance function. In the case of the A and B networks, this addition information is that $|Z|=R$ at the center frequency $f_b$. The minus sign for Z is used when there is a zero at infinite frequency, while the plus sign for Z is used when there is a pole at infinite frequency.

The H constant in Formulae 1 and 2 above is obtained by equating $|Z|$ of the particular network to R at $f_b$ (the center frequency). The mathematics of the solution can be simplified by normalizing the calculation by setting $R=1$. After the results have been obtained, the correct values of inductance can be obtained by multiplying the inductance values by R while the correct values of capacitance can be obtained by dividing the capacity values by R.

Letting $|Z|=R=1$, at frequency $f_b$ for the A network having a reactance-frequency plot as shown in FIG. 1, Equation 2 reduces to the following equation:

$$I=-j\frac{H\omega_b(\omega_b^2-\omega_a^2)}{(\omega_b-\omega_x^2)(\omega^2-\omega_c^2)} \qquad (3)$$

Solving Equation 3 for H produces the following equation:

$$H=j\frac{(\omega_b^2-\omega_x^2)(\omega_b^2-\omega_c^2)}{\omega_b(\omega_b^2-\omega_a^2)} \qquad (4)$$

Substituting the value for H of Equation 4 into Equation 2 and letting $Z=jX_a$, where $X_a$ is the reactance of the A network, and simplifying, produces the following equation:

$$X_a=-j(+j)\frac{\omega(\omega_b^2-\omega_x^2)(\omega_b^2-\omega_c^2)(\omega^2-\omega_a^2)}{\omega_b(\omega_b^2-\omega_a^2)(\omega^2-\omega_x^2)(\omega^2-\omega_c^2)} \qquad (5)$$

Factoring out the $2\pi$ factors in the $\omega$ terms of Equation 5 produces the following equation:

$$X_a=\frac{f(f_b^2-f_x^2)(f_b^2-f_c^2)(f^2-f_a^2)}{f_b(f_b^2-f_a^2)(f^2-f_x^2)(f^2-f_c^2)} \qquad (6)$$

where $f$ is any frequency, and the other frequencies are shown as the poles and zeros and the center frequencies of the A network in FIG. 1.

The reactance, $X_b$, of the B network of FIG. 1, is found in a similar manner to be $$X_b=\frac{f(f_b^2-f_a^2)(f^2-f_c^2)(f_b^2-f_d^2)}{f_b(f_b^2-f_c^2)(f^2-f_a^2)(f^2-f_d^2)} \qquad (7)$$

Referring now to FIG. 6, feed resistor 2 is connected in series with A network 1 while feed resistor 4 is connected in series with B network 3 across a source of potential (not shown) having a voltage, E. For simplicity assume the driving voltage, E, is equal to unity and that the resistance of resistors 2 and 4 is equal to the design resistance, R, of networks 1 and 3, or unity. Then, the voltage, $E_a$, across the A network 1 is $$E_a=\sin\tan^{-1}X_a \qquad (8)$$

and the voltage, $E_b$, across the B network 3 is $$E_b=\sin\tan^{-}X_b \qquad (9)$$

Simplifying, Equation 8 becomes $$E_a=\frac{X_a}{\sqrt{X_a^2+1}}=\frac{1}{\sqrt{1+\frac{1}{X_a^2}}} \qquad (10)$$

and Equation 9 becomes $$E_b=\frac{X_b}{\sqrt{X_b^2+1}}=\frac{1}{\sqrt{1+\frac{1}{X_b^2}}} \qquad (11)$$

Solving Equation 10 for $X_a$, produces $$X_a=\frac{E_a}{\sqrt{1-E_a^2}} \qquad (12)$$

Solving Equation 11 for $X_b$, produces $$X_b=\frac{E_b}{\sqrt{1-E_b^2}} \qquad (13)$$

The above relations between $E_a$ and $X_a$ and between $E_b$ and $X_b$ are obviously very similar. Any of the above relations can be used to determine one of the variables with given values of the other of the variables. The results may be shown on a set of tables or they may be graphically illustrated by drawing a curve through predetermined points on a graph.

As has been previously pointed out in the objects of this invention, the discriminator circuit of this invention is to have an output signal whose magnitude has greatly improved linearity with respect to frequency variations in the discriminator input signal within a given band width. The given band width shown in the example of FIG. 1 is between frequencies $f_a$ and $f_c$. If the networks are so designed as to give the following values for $E_o$ at the five equi-spaced frequencies $f_a$, $f_y$, $f_b$, $f_z$ and $f_c$ within the band width, it can readily be seen that the linearity of the discriminator is very high since it would have five points on a straight line:

$$f=f_a \quad ; E_a=0, E_b=1; E_o=-1.0$$

$$f=f_y=\frac{f_a+f_b}{2}; \quad ; E_o=-0.5$$

$$f=f_b \quad ; E_a=E_b=.707; E_o=\ 0$$

$$f=f_z=\frac{f_b+f_c}{2}; \quad ; E_o=\ 0.5$$

$$f=f_c \quad ; E_a=1, E_b=0; E_o=\ 1.0$$

The first, third and fifth relations are accomplished by the poles and zeroes at $f_a$ and $f_c$ and by the determination of H with $X_{ab}$ and $X_{bb}$ equal to R or 1 at frequency $f_b$. This alone gives a fairly linear output with three points on the straight line.

The second and fourth relations are accomplished at frequencies $f_y$ and $f_z$, by selectively determining the frequencies $f_x$ and $f_d$ in such a manner that will make $E_o$ have the proper values at the frequencies $f_y$ and $f_z$, assuming that the driving or source voltage does not change and comes from a source of low or negligible impedance. It is well to note here that although frequencies $f_y$ and $f_z$ are selected as mid-points between frequencies $f_a$ and $f_b$ and frequencies $f_b$ and $f_c$, respectively, they need not be but could be any preselected frequencies equi-spaced from frequency $f_b$ and within the band width.

It is possible to solve simultaneous equations to determine the frequencies $f_x$ and $f_d$, but this method is very laborious and a graphical method has been developed and will be explained.

For purposes of illustration assume a center frequency, $f_b$, of 130 megacycles, a discriminator band width of 30 megacycles, making lower edge frequency $f_a$ equal to 115 megacycles and upper edge frequency $f_c$ equal to 145 megacycles. The intermediate frequencies are assumed to be $f_y=122.5$ megacycles and $f_z=137.5$ megacycles. In this illustration and assuming a unity input voltage E, the output voltages, $E_o$, of the discriminator circuit at frequencies $f_y$ and $f_z$ should be $-0.5$ and 0.5 volt, respectively.

Figure 8:
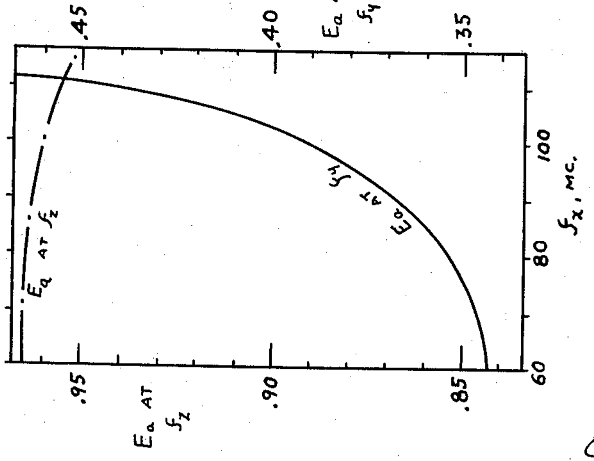
FIG. 8 is a graph of the variations in magnitude of the ouput signals across the networks utilized in the preferred embodiment of this invention shown in FIG. 6 plotted against variations in a preselected design frequency.

A series of four graphic plots are now made on two separate sheets of graph paper (one of which should be transpartent). On the first sheet, such as shown in FIG. 8, two graphic plots are made of variations in voltage $E_a$ of the A network 1 with variations in the frequency of the pole designed into the A network at frequency $f_x$. In the example shown in FIG. 8, frequency $f_x$ is plotted between the values of 60 megacycles and 110 megacycles along the abscissa. Two different ordinate scales are utilized for values of voltage $E_a$. The left scale of FIG. 8 is utilized for values of $E_a$ when the input voltage is at frequency $f_z$ while the right scale of FIG. 8 is utilized for values of $E_a$ when the input voltage is a frequency $f_y$. The two scales are displaced by the aforementioned 0.5 volt, previously mentioned. The solid line on the graph of FIG. 8 is a plot of the variations in $E_a$ at frequency $f_y$ with different values of $f_x$. The broken line on the graph of FIG. 8 is a plot of the variations in $E_a$ at frequency $f_z$ with different values of $f_x$.

Figure 9:
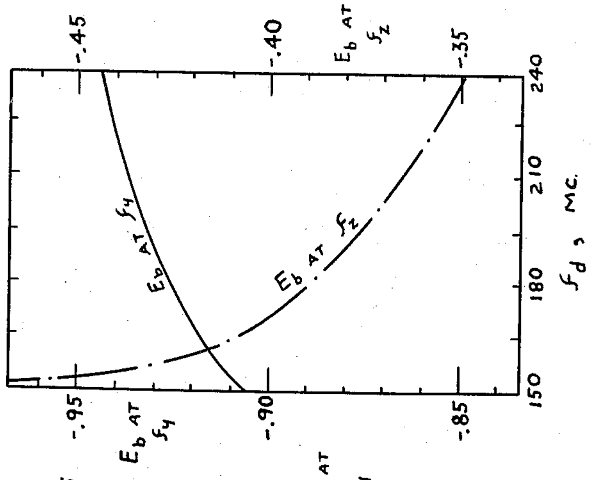
FIG. 9 is a graph of the variations in magnitude of the output signals across the networks utilized in the preferred embodiment of this invention shown in FIG. 6 plotted against variations in a second preselected design frequency.

On the second sheet of graph paper, shown in FIG. 9, similar plots of variations in voltage $E_b$ of B network 3 with input frequencies $f_y$ and $f_z$ with variations in the frequency of the pole designed into the B network at frequency $f_d$ are made. In this FIG. 9 the solid line indicates variations in voltage $E_b$ at frequency $f_y$ with different values of $f_d$, while the broken line indicates variations in voltage $E_b$ at frequency $f_z$ with different values of frequency $f_d$. As can be seen the ordinates of FIG. 9 are once again displaced by the aforementioned 0.5 volt, through in this case it is a negative voltage.

Figure 10:
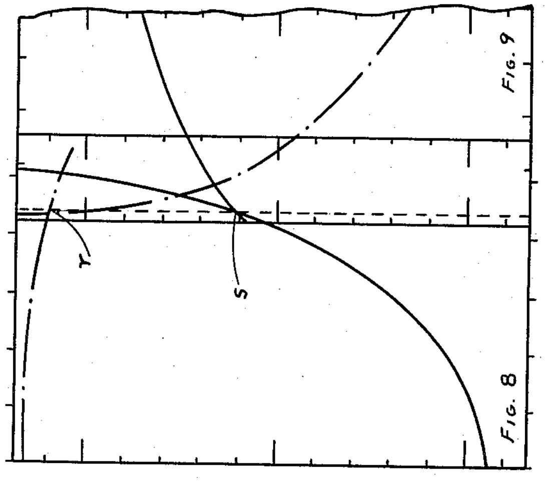
FIG. 10 is a drawing showing the use made of the graphs of FIGS. 8 and 9.

The two graphs are now superimposed with the ordinates of like numerical value aligned, that is, the left side 0.90 ordinaate of the graph of FIG. 8 is aligned with the left side $-0.90$ ordinate of the graph of FIG. 9, etc. The graphs are moved horizontally until the intersection of the two broken lines is exactly vertical with respect to the intersection of the two solid lines of the graphs. These two points are shown as points $r$ and $s$ in FIG. 10. When this condition is satisfied, the values of frequencies $f_x$ and $f_d$ corresponding to those intersections can readily be obtained. In the example of FIG. 10, these values are shown as 104 megacycles for frequency $f_x$ and 154 megacycles for frequency $f_d$.

It is, of course, readily apparent that greater accuracy in finding the values of frequencies $f_x$ and $f_d$ by the graphical method shown above can be obtained by expanding that portion of the graph after an initial estimate of their value is obtained.

After the final values for the A and B network pole and zero frequencies have been determined as just described, the networks are designed and the proper values of the various inductances and capacitors are determined by the methods described by Foster, Terman, Guillemin, and Cauer, as previously cited.

Thus, having obtained the frequency positions of the poles at frequency $f_x$ and $f_d$ necessary to produce a difference output voltage $E_o=E_a-E_b$ at input signal frequencies $f_y$ and $f_z$ exactly equal to $-0.5$ volt and 0.5 volt, respectively, it is a comparatively simple design matter to design an A network 1 of the type shown in FIG. 2 in which the capacitive and inductive reactances of components 5, 6, 7 and 8 combine to produce a zero at frequency $f_0$, a pole at frequency $f_x$, a zero at frequency $f_a$, an inductive reactance equal to R at frequency $f_b$, a pole at frequency $f_c$ and a zero at infinite frequency. Similarly B network 3 can readily be designed by the proper selection of capacitive and inductive reactances of components 9, 10, 11 and 12 in FIG. 3 in a manner to produce a zero at frequency $f_0$, a pole at frequency $f_a$, a capacitive reactance equal to R at frequency $f_b$, a zero at frequency $f_c$, a pole at frequency $f_d$ and a zero at infinite frequency.

The methods of designing such networks having given poles and zeros are well-known to those skilled in the arts and need not be further described here. It is also well-known that such networks having the desired characteristics may be constructed of numerous different combinations and arrangements of elements. For example, networks A and B may be constructed of components of appropriate inductive and capacitive values arranged as shown by elements 13–16 and 17–20 of FIGS. 4 and 5, respectively.

At this stage of the design problem, the best network configuration and design impedance R of the networks will usually be indicated by considering the physical quantities involved, taking into account the unavoidable stray circuit capacity to ground, which must be subtracted from capacitors 5 and 9 of FIGS. 2 and 3, for example, or allowed for in the case of capacitors 14 and 16 of FIG. 4 and 18 and 20 of FIG. 5. In some cases capacitors 7 and 11 may be too small for good or easy physical construction, and alternate forms such as shown in FIGS. 4 and 5, or the well-known Cauer ladder network form may be desirable.

In any case, the capacitors or inductors, or both, in the networks should be made adjustable in order to permit the circuit to be adjusted to the specified zeros and poles after the networks are assembled and in place in the equipment. Slight final adjustments may then be made using frequency sweep oscillators, and also harmonic or intermodulation test equipment for final adjustment, which also compensates for the non-linearity of the diode rectifiers or other devices used to convert $E_a$ and $E_b$ to direct currents or voltages prior to combining them to secure $E_o$.

Referring now to FIG. 6 a circuit for deriving output voltage $E_o$ from voltages $E_a$ and $E_b$ is shown. It is readily apparent that other methods may be used. The usual driving source for the discriminator is a low impedance limiter, such as a shunt type limiter. It is evident that the A and B networks can also be arranged in the manner shown in FIG. 7 in which case a constant current or high impedance source, such as a series type limiter, is desirable.

Figure 7:
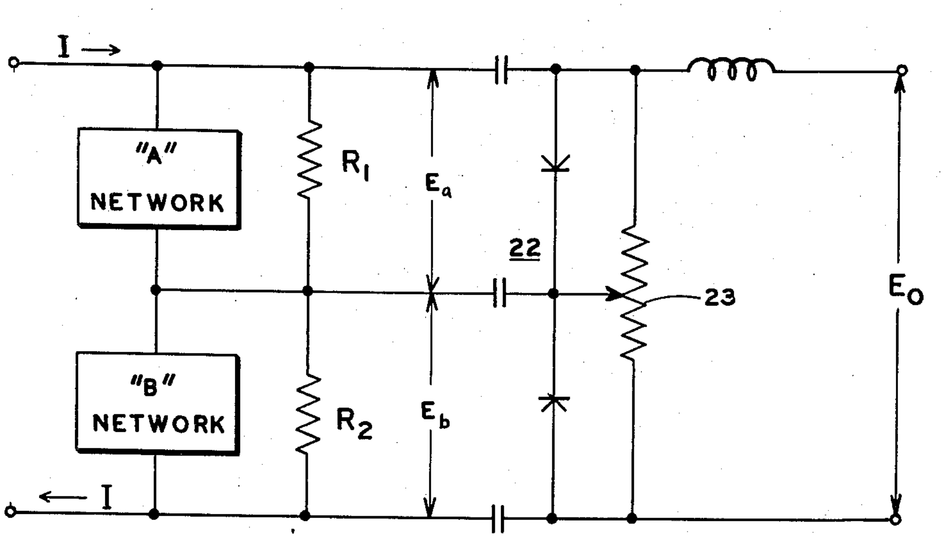
FIG. 7 is a schematic drawing of an alternate embodiment of the discriminator circuit contemplated by this invention.

In the arrangement shown in FIG. 7, $E=IR_1$ and $E=IR_2$, where I is the constant current from the source (not shown) and E is the previously described driving voltage. In this case, the impedance of the source should be large compared to $R_1$ and $R_2$. $E_a$ and $E_b$ are combined by the diode arrangement 22 in which tapped resistor 23 has a high resistive value and is employed to equalize slight differences in diode efficiency. Resistor 23 may be omitted if the diodes are well enough balanced and a direct current return for the rectified current of the diodes can be provided elsewhere (not shown) in the circuit.

Alternatively in FIG. 6, the voltages developed across the resistors $R_1$ and $R_2$ can be used if desired instead of the voltages across the networks. In that case the design steps are similar except $$E_a = \cos \tan^{-1} \frac{X_a}{R_1} \text{ and } E_b = \cos \tan^{-1} \frac{X_b}{R_2}$$

It is also possible to design four networks instead of two and use the two additional networks in the positions usually occupied by the resistors $R_1$ and $R_2$, loading the combined networks, either internally or externally, with resistance to control the impedance of the design center frequency. These methods, however, usually are undesirable because of greater complexity or undesirable stray capacity effects and are considered to be only variations of the fundamental design explained herein.

It is also usually good design practice to design the operating range of the discriminator circuit somewhat wider than the pass band of the circuit feeding it, so that, for example, if the intermediate frequency amplifiers of a receiver are slightly readjusted, it will not be necessary to readjust the discriminator band width. This also prevents either $E_a$ or $E_b$ from becoming zero under operating conditions and also assists obtaining overall linearity, since diode rectifiers are usually less linear under low voltage conditions.

In the circuit designs of FIGS. 6 and 7, resistors $R_1$ and $R_2$ are preferably designed to compensate for the loading effect of the rectifier arrangements 21 and 22. Therefore, the parallel arrangements of $R_1$ and its associated output load circuit and of $R_2$ and its associated output load circuit, should approximately equal the design impedance R of the A and B networks. It has been found that by making small adjustments to the total impedances of the parallel arrangements of $R_1$ and its associated output load circuit and of $R_2$ and its associated output load circuit to thereby cause these total impedances to differ from the design impedance R, some improvement in the linearity between the five points of absolute linearity in the output of the discriminator circuit of this invention can be obtained.

Although this invention has been described and illustrated in detail, it is to be clearly understood that the same is by way of illustration and example only and is not to be taken by way of limitation, the spirit and scope of this invention being limited only by the terms of the appended claims.

I claim:

1. A linear discriminator circuit sensitive to signals within a preselected design band width comprising a first two-terminal network having a pole at substantially the upper edge frequency of said design band width, a zero at substantially the lower edge frequency of said design band width, and a reactive impedance substantially equal to the design impedance of said network at the center frequency of the band width; a second two-terminal network having a zero at substantially the upper edge frequency of said design band width, a pole at substantially the lower edge frequency of said design band width, and a reactive impedance substantially equal to the design impedance of said second network at the center frequency of said design band width, said first and second networks having substantially the same design impedance; a first resistor; a second resistor having substantially the same ohmic resistance as said first resistor; means connecting said first resistor in series with said first network and said second resistor in series with said second network; and means for rectifying and combining the voltages produced across said networks when said series-connected resistor-networks are subjected to input signals of frequencies within said design band width whereby the output of said combining means is a linear function of the frequency variations of said input signals.

2. A linear discriminator circuit sensitive to signals within a preselected design band width comprising a first two-terminal network having a pole at a frequency not less than the upper edge frequency of said design band width, a zero at a frequency not greater than the lower edge frequency of said design band width, and an inductive reactive impedance substantially equal to the design impedance of said network at the center frequency of said band width; a first resistor connected in series with said first two-terminal network and having an ohmic resistance substantially equal to said design impedance of said network; a second two-terminal network having a zero at a frequency substantially equal to the pole frequency of said first network, a pole at a frequency substantially equal to the zero frequency of said first network, and a capacitive reactive impedance substantially equal to the design impedance of said second two-terminal network at the center frequency of said design band width, said first and second networks having substantially the same design impedance; a second resistor connected in series with said second two-terminal network and having an ohmic resistance substantially equal to said design impedance of said network; and means for rectifying and combining the voltages across said first and second networks when said series-connected resistor-networks are subjected to input signals of frequencies within said design band width whereby the output of said combining means is a linear function of the frequency variations of said input signals.

3. A matched pair of networks useful in a linear discriminator circuit of preselected design band width comprising a pair of networks having substantially identical preselected design impedances, each of said networks being designed to have impedance vs frequency plots with at least one pole and at least one zero, a first of said networks having a pole at the upper edge frequency of said design band width, a zero at the lower edge frequency of said design band width, and an inductive reactance substantially equal to the design impedance of said networks at the center frequency of said design band width, a second of said networks having a pole at the lower edge frequency or said design band width, a zero at the upper edge frequency of said design band width, and a capacitive reactance substantially equal to the design impedance of said networks at the center frequency of said design band width.

4. A linear discriminator circuit of a preselected design band width for converting a phase modulated input signal within sad preselected design band width into an amplitude modulated output signal comprising a first two-terminal network having a preselected design impedance and having at least two poles and at least one zero, one of said poles being a frequency substantially equal to the upper edge frequency of said design band width, the zero being at a frequency substantially equal to the lower frequency of said design band width, the second of said poles being at a preselected frequency below the lower edge frequency of said design band width, said first network being further designed to have an inductive reactive impedance at the center frequency of said design band width substantially equal to said preselected design impedance; a first feed resistor connected to said first network; a second two-terminal network having a preselected design impedance substantially equal to said design impedance of said first network and having at least two poles and at least one zero, one of said poles being at a frequency substantially equal to the lower edge frequency of said design band width, the zero being at a frequency substantially equal to the upper edge frequency of said design band width, the second of said poles being at a preselected frequency above the upper edge frequency of said design band width, said second network being further designed to have a capacitive reactive impedance at the center frequency of said design band width substantially equal to said preselected design impedance; a second feed resistor connected to said second network; means subjecting both of said resistor-network circuits to said input signals; and means for rectifying and combining the signals across said first and second networks and having an output voltage whose magnitude varies with the difference in magnitude of said rectified signals.

5. A linear discriminator circuit as recited in claim 4 in which said second pole of said first network and said second pole of said second network are preselected in a manner to produce two additional points of linearity in the output of said combining means at two frequencies within said design band width and spaced equal distances on either side of said center frequency.

6. A linear discriminator circuit as recited in claim 4 in which said second pole of said first network and said second pole of said second network are at frequencies preselected in a manner to produce, when said networks are subjected to signals of a first intermediate frequency within said design band width and below said center frequency, a voltage output of said combining means which is in the same linear proportion to the voltage output of said combining means when said networks are subjected to equal magnitude signals at said lower edge frequency of said design band width as the frequency displacement of said intermediate frequency from said center frequency is to half the design band width, said preselected frequencies of said second pole of said first network and said second pole of said second network being further preselected in a manner to produce, when said networks are subjected to constant magnitude signals of a second intermediate frequency within said design band width and above said center frequency, a voltage output of said combining means which is in the same linear proportion to the voltage output of said combining means when said networks are subject to equal magnitude signals at said upper edge frequency of said design band width as the frequency displacement of said second intermediate frequency from said center frequency is to half the design band width.

7. A linear discriminator circuit for converting a frequency modulated input signal of a preselected band width into an amplitude modulated output signal comprising a first network having a preselected design impedance and further designed to have a frequency-reactance plot with substantially infinite reactive impedance at a frequency substantially equal to the upper edge frequency of said preselected band width, substantially zero reactive impedance at a frequency substantially equal to the lower edge frequency of said preselective band width, an inductive reactance impedance substantially equal to said preselected design impedance at the center frequency of said preselected band width and substantially infinite reactive impedance at a first preselected design frequency lower than the lower edge frequency of said preselected band with; a second network having a design impedance substantially equal to said design impedance of said first network and further designed to have a frequency-reactance plot with substantially infinite reactive impedance at a frequency substantially equal to the lower edge frequency of said preselected band width, substantially zero reactive impedance at a frequency substantially equal to the upper edge frequency of said preselected band width, a capacitive reactive impedance substantially equal to said design impedance at the center frequency of said preselected band width, and substantially infinite reactive impedance at a second preselected design frequency higher than the upper edge frequency of said preselected band width; a second feed resistor connected in series with said second network, said first and second resistors having substantially the same ohmic resistance and substantially equal in magnitude to said preselected design impedance of said networks; and means for rectifying and combining the signals across said first and second networks when said first and second series connected resistor-network combinations are subjected to a constant magnitude frequency-modulated input signal.

8. A linear discriminator circuit as recited in claim 7 in which said first preselected design frequency of said first network and said second preselected design frequency of said second network are preselected in a manner to produce two additional points of linearity in the output of said combining means at two frequencies within said design band width and spaced equal distances on either side of said center frequency.

9. A linear discriminator circuit as recited in claim 7 in which said first preselected design frequency and said second preselected design frequency are preselected in a manner to produce, when said series-connected resistor-network combinations are subjected to signals of a preselected constant amplitude at a first intermediate frequency within said band width and lower than said center frequency of said band width, a signal output of said combining means which is in the same linear proportion to the signal output of said combining means when subjected to signals of the same preselected constant amplitude and at the lower edge frequency of said band width, as the difference frequency between said first intermediate frequency and said center frequency of said band width is to half the band width and further to produce, when said series-connected resistor-network combinations are subjected to signals of preselected constant amplitude but at a second intermediate frequency within said band width and higher than said center frequency of said band width, a signal output of said combining means which is in the same linear proportion to the signal output of said combining means when subjected to signals of the same preselected constant amplitude and at the upper edge frequency of said band width, as the difference frequency between said second intermediate frequency and said center frequency of said band width is to half the band width.

10. A matched pair of networks useful in a linear discriminator circuit of preselected design band width comprising a pair of networks having substantially identical preselected design impedances, each of said networks being designed to have impedance vs. frequency plots with at least two poles and at least one zero, a first of said networks having a pole at the upper edge frequency of said design band width, a second of said networks having a pole at the lower edge frequency of said design band width, said first network having a zero at the lower edge frequency of said design band width, said second network having a zero at the upper edge frequency of said design band width, each of said networks being further designed to have reactive impedances substantially equal to said preselected design impedances at the center frequency of said design band width, the second pole of said first network being at a first preselected frequency below said lower edge frequency of said design band width, the second pole of said second network being at a second preselected frequency above the upper edge frequency of said design band width, said first and second preselected frequencies of said second poles of said first and second networks being preselected to produce additional points of linearity in output of said discriminator circuit.

References Cited in the file of this patent

UNITED STATES PATENTS

| | | |
|---|---|---|
| 2,243,417 | Crosby | May 27, 1941 |
| 2,312,070 | Bliss | Feb. 23, 1943 |
| 2,528,365 | Hollis | Oct. 31, 1950 |